US012608591B2

(12) United States Patent
Desai et al.

(10) Patent No.: US 12,608,591 B2
(45) Date of Patent: Apr. 21, 2026

(54) DEEP LEARNING MODELS PROCESSING TIME SERIES DATA

(71) Applicant: ACCENTURE GLOBAL SOLUTIONS LIMITED, Dublin (IE)

(72) Inventors: Vijay Desai, San Diego, CA (US); Ravi Prakash, Bangalore (IN); Abdus Saboor Khan, San Francisco, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1149 days.

(21) Appl. No.: 17/563,924

(22) Filed: Dec. 28, 2021

(65) Prior Publication Data

US 2023/0206028 A1 Jun. 29, 2023

(51) Int. Cl.
  G06N 3/044 (2023.01)
  G06N 3/08 (2023.01)
(52) U.S. Cl.
  CPC .............. G06N 3/044 (2023.01); G06N 3/08 (2013.01)
(58) Field of Classification Search
  CPC .......... G06N 3/044; G06N 3/08; G06N 3/045; G06N 3/084
  See application file for complete search history.

(56) References Cited

U.S. PATENT DOCUMENTS

| | | | | |
|---|---|---|---|---|
| 8,364,517 | B2 * | 1/2013 | Trovero | G06Q 30/0202 |
| | | | | 705/7.29 |
| 11,003,910 | B2 * | 5/2021 | Bigaj | G06V 20/584 |
| 2021/0344745 | A1 * | 11/2021 | Mermoud | G06N 3/0895 |

OTHER PUBLICATIONS

"A cross-temporal hierarchical framework and deep learning for supply chain forecasting", https://www.sciencedirect.com/science/article/pii/S0360835220305040, Punia et al., Sep. 6, 2020) (Year: 2020).*
"Automated Feature Generation from Structured Knowledge", https://www.herbrich.me/papers/cikmfp0337-cheng.pdf, Cheng et al., Oct. 24, 2011). (Year: 2011).*
"Pre-release sales forecasting: A model-driven context feature extraction approach", https://ieeexplore.ieee.org/stamp/stamp.jsp?tp=&arnumber=6964879&tag=1, Tian et al., 2014) (Year: 2014).*
"Empowering Adaptive Early-Exit Inference with Latency Awareness", https://doi.org/10.1609/aaai.v35i11.17181, Tan et al., 2021) (Year: 2021).*

(Continued)

*Primary Examiner* — Kakali Chaki
*Assistant Examiner* — Jacob Z. Sussman Moss
(74) *Attorney, Agent, or Firm* — Mannava & Kang, P. C.

(57) ABSTRACT

An Artificial Intelligence (AI) based data processing system transforms a plurality of time series data sets for processing by one or more deep learning (DL) models for generating forecasts. The DL models are initially trained on training data generated from the historical data. During operation, a plurality of transformed time series data sets are generated from the plurality of time series data sets associated with different entities in an entity hierarchy via data flattening and data stacking. A primary model of the one or more DL models is trained on first-party data for generating the forecasts. An extended model of the one or more DL models is trained on third-party data from external data sources. Whenever new data is available in the first-party data or the third-party data, the primary model and the extended model are correspondingly updated.

19 Claims, 11 Drawing Sheets

(56)         References Cited

OTHER PUBLICATIONS

"Network Public Opinion Prediction and Control Based on Edge Computing and Artificial Intelligence New Paradigm", https://doi.org/10.1155/2021/5566647, Zhu, Apr. 19, 2021) (Year: 2021).*
"Integrated hierarchical forecasting", https://doi.org/10.1016/j.ejor.2017.04.047, Pennings et al., 2017) (Year: 2017).*

* cited by examiner

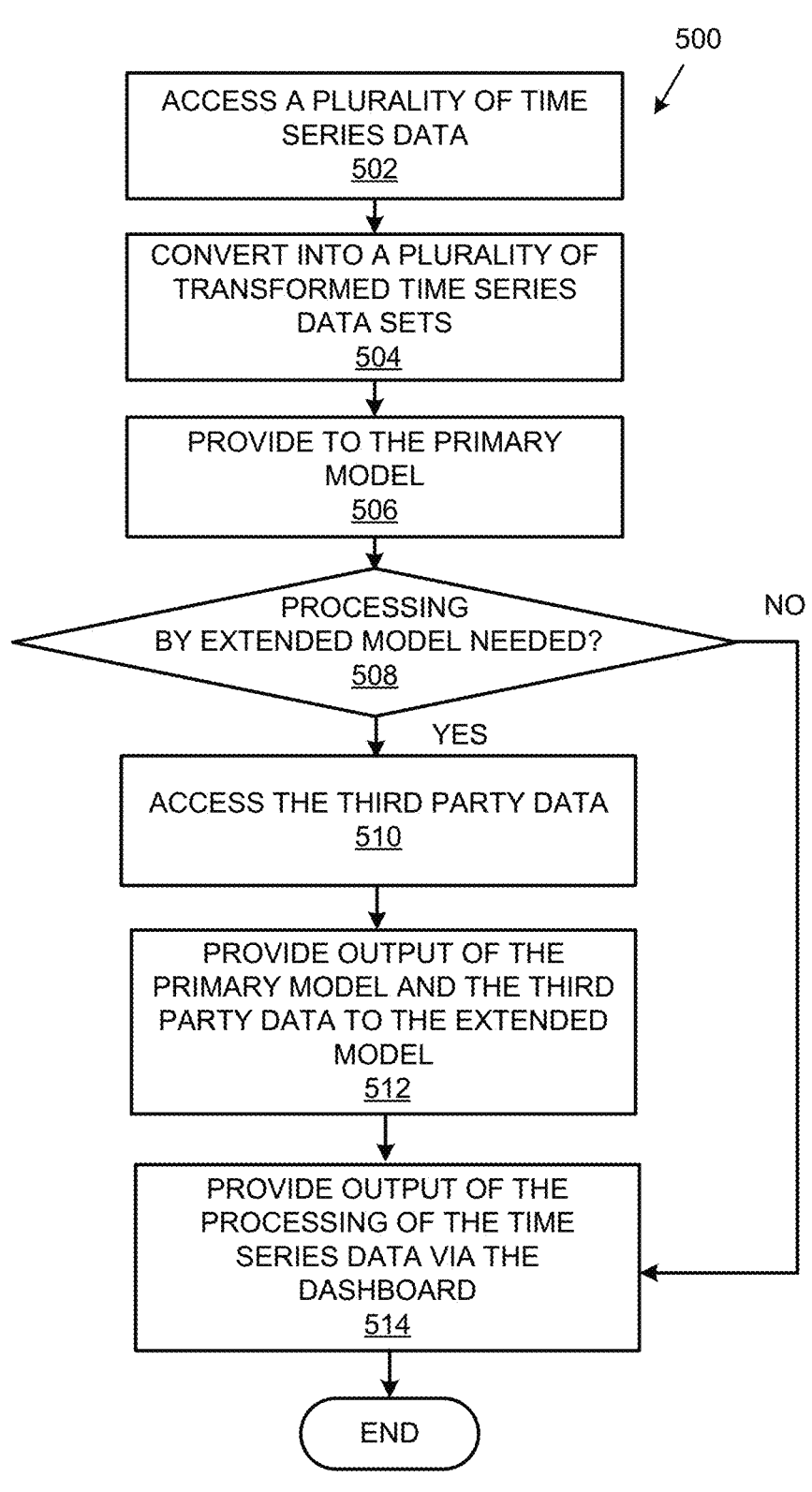

500

ACCESS A PLURALITY OF TIME SERIES DATA
502

CONVERT INTO A PLURALITY OF TRANSFORMED TIME SERIES DATA SETS
504

PROVIDE TO THE PRIMARY MODEL
506

PROCESSING BY EXTENDED MODEL NEEDED?
508

NO

YES

ACCESS THE THIRD PARTY DATA
510

PROVIDE OUTPUT OF THE PRIMARY MODEL AND THE THIRD PARTY DATA TO THE EXTENDED MODEL
512

PROVIDE OUTPUT OF THE PROCESSING OF THE TIME SERIES DATA VIA THE DASHBOARD
514

END

SELECT AN ATTRIBUTE OR AN
OUTPUT VARIABLE
602

IDENTIFY THE ENTITY
ASSOCIATED WITH THE OUTPUT
VARIABLE
604

ACCESS THE DATA STRUCTURE
REPRESENTING THE ENTITY
HIERARCHY
606

IDENTIFY THE SUB-ENTITIES
FROM THE ENTITY HIERARCHY
608

FRAME THE OUTPUT ATTRIBUTE
VECTOR IN TERMS OF ATTRIBUTE
VALUES OF SUB-ENTITIES
610

ANALYZE ANOTHER
OUTPUT  ATTRIBUTE?
612

YES

NO

END

700

ACCESS THE ENTITY HIERARCHY
702

SELECT AN ENTITY
704

IDENTIFY THE ENTITIES HIGHER
UP AND LOWER DOWN IN THE
ENTITY HIERARCHY
706

SET THE VALUES TO INDICATE
HIERARCHICAL RELATIONS
708

MORE ENTITIES?
710

YES

NO

END

DEEP LEARNING MODELS PROCESSING TIME SERIES DATA

BACKGROUND

Time series includes a series of data points indexed in a temporal order. Particularly, a time series is a sequence of data points that occur in successive order over some period of time or it is a sequence of discrete time data. Time series forecasting is a significant area of research in many domains as many different types of data are tracked over time and stored as time series data sets. Applications of time series can include domains as varied as weather forecasting, medicine, financial domain, etc. Given the increasing availability of data storage and processing power of computers recently, the application of prediction methodologies such as deep learning (DL) to time series data is being explored.

BRIEF DESCRIPTION OF DRAWINGS

Features of the present disclosure are illustrated by way of examples shown in the following figures. In the following figures, like numerals indicate like elements, in which:

FIG. 5 shows a flowchart that details a method of processing time series data using DL models in accordance with the examples disclosed herein.

DETAILED DESCRIPTION

Figure 1:
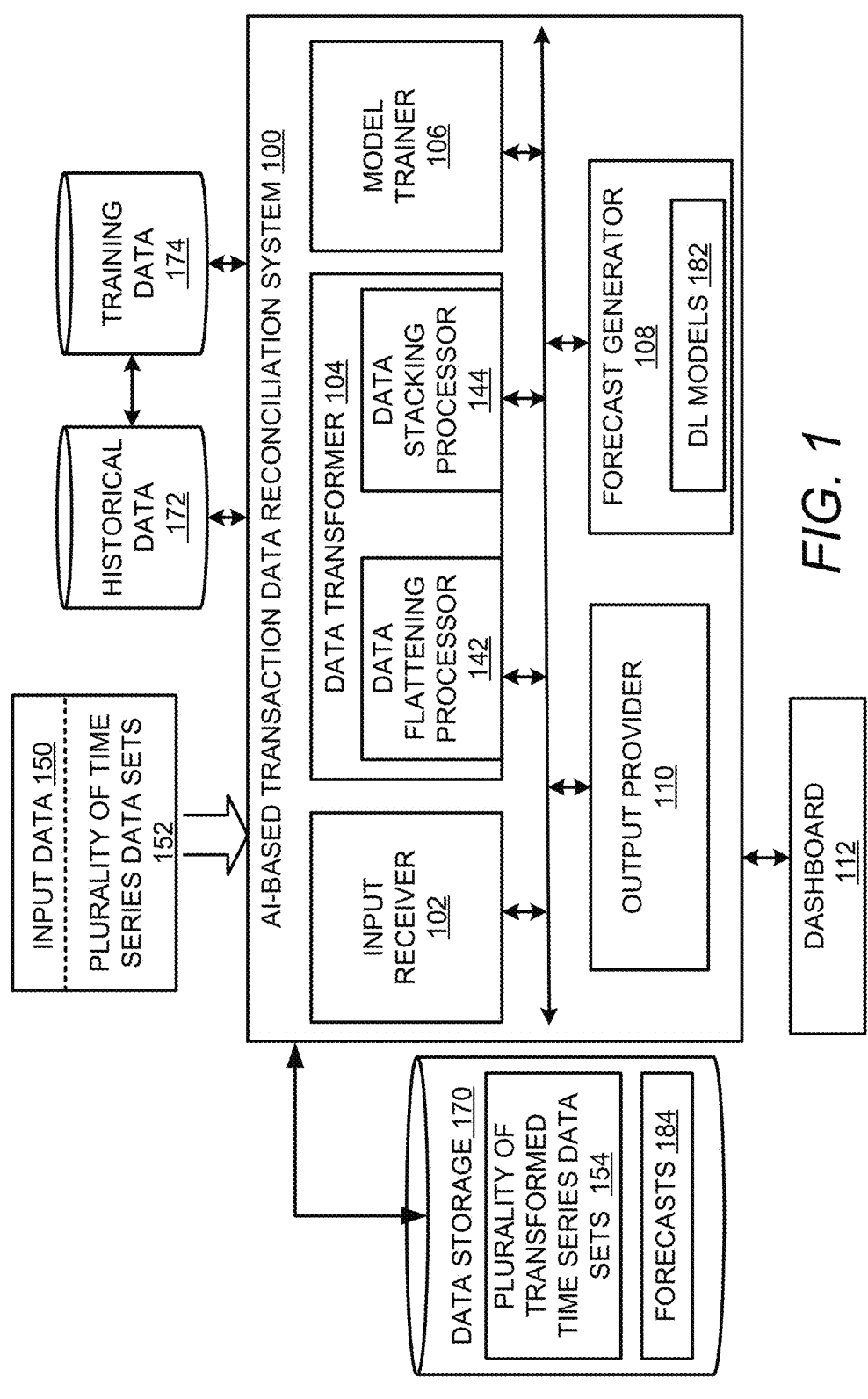
FIG. 1 shows a block diagram of an AI-based data processing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based transaction data processing system is disclosed. The data processing system provides a plurality of time series data sets to one or more DL models for the generation of forecasts for future time steps for the variables associated therewith. The plurality of time series data sets are associated with different entities which maintain a hierarchical relationship with each other that are encoded in an entity hierarchy. The entities can represent different real-world objects that bear hierarchical relationships with each other. Each time series data set is therefore a collection of values for a specific attribute or a corresponding variable of the entity collected at different times steps.

The plurality of time series data sets are initially transformed into a plurality of transformed time series data sets. The transformation process includes data flattening and data stacking so that the DL models can process the time series data. In an example, the AI-based transaction data processing system can include code that executes the data flattening procedure. Such code initially uses statistical Auto Correlation Function (ACF) test to identify the level of correlation between the values in the time series that further enables determining the parameters for data flattening. For each variable corresponding to a particular time series data set in the plurality of time series data sets, data flattening can include, identifying an entity associated with the corresponding variable and the sub-entities of that entity from the entity hierarchy. A vector is framed for the corresponding variable so that the dimensions of the vector are the attributes of the sub-entities. Data stacking includes determining other entities that are higher up or lower down the entity of the corresponding variable and setting values in the transformed time series data set so that the values indicate the hierarchical relations between the entity and the other entities. In an example, the number of data sets in the plurality transformed time series data sets can be greater than the number of data sets in the plurality of time series data sets.

The plurality of transformed time series data sets that are thus generated are provided to the DL models. In an example, two DL models including a primary model and an extended model are used to generate the forecasts. The primary model receives first-party data i.e., data from internal or known/authenticated sources such as the plurality of transformed time series data sets to generate forecasts. The extended model can receive the outputs of the primary model in addition to third-party data to generate forecasts. The extended model receives third-party data, the extended model is also enabled to generate what-if scenarios. The outputs from the DL models can be provided to the user via the graphical user interfaces (GUIs) such as a dashboard or other modalities such as automatic communications via emails, etc. to the users.

The DL models are trained on historical data which can include prior time series data sets. More particularly, the primary model can access the historical data and may be trained on the prior time series data sets while the extended model is trained on the outputs generated by the trained primary model and the corresponding third-party data. In an example, the DL models are automatically trained as new data is made available due to the updates to the first-party data and/or the third-party data. Accordingly, one or more of the primary model and the extended model may be updated depending on whether the updates occurred in one or more of the first-party data or the third-party data. The forecasts provided by the DL models are also automatically updated with the updates to the DL models. Therefore, the users are provided with accurate forecasts in real-time that keep up with the latest data.

The AI-based data processing system provides a technical solution to the technical problem of processing time series data with DL models. The plurality of time series data sets associated with the entity hierarchy are very stable for higher levels of the hierarchy, however, the data can be very sparse at the bottom of the entity hierarchy. It is generally the case that newer entities emerge more frequently at the lower levels of the entity hierarchy. For example, newer products may be added more frequently as opposed to newer manufacturing units being added. The impact in the time series data sets for higher-level entities is greater while it can be unstable at the lower levels. In such scenarios, the accuracy of forecasts can be improved by using data trends from time series data sets associated with the child and the parent series. Therefore, the problem changes from forecasting for each series to forecasting for every node of a hierarchical structure wherein all nodes are interdependent. Therefore, there is a need for a data processing system configured for processing all the time series data sets together and which can learn from its historical patterns and historical patterns of other series as well such as those of third-party time series data sets.

Furthermore, the sparse data availability of the entity hierarchy prevents using DL models for forecasting. While DL models generate accurate forecasts, training such DL models requires large volumes of data for training purposes which levels may be unavailable for the entity-based time series data described herein. The data processing steps described herein for data flattening and data stacking enable generating additional training data by increasing the volume of data. The plurality of time series data sets are therefore increased in volume or expanded since a single variable associated with a single time series data set is expressed as a multidimensional vector via the data flattening and data stacking processes. This permits feeding the plurality of time series data sets associated with the entity hierarchy to the DL models for training and forecast generation purposes. Therefore, DL models are enabled to process sparse time series data associated with the entity hierarchy within the context of the hierarchical relationships.

FIG. 1 shows a block diagram of an AI-based data processing system 100 in accordance with the examples disclosed herein. The AI-based data processing system 100 receives or accesses input data 150 which can include a plurality time series data sets 152 generated for different entities which maintain a hierarchical relationship. By way of illustration and not limitation, the different entities maintaining a hierarchical relationship can include a site of an organization (e.g., a manufacturing site, an organization headquarters, or a site of a financial firm, etc.) which further includes various units. Each unit can have different categories associated therewith while each category is further associated with one or more products. Attribute values of each of the different entities in the hierarchy generated at different time steps can be associated with one of the time series data sets 152. For example, the plurality of times series data sets 152 can include invoice data extracted from the invoices associated with manufacturing facilities or other units in specific geographical regions. The invoice data may include but is not limited to, organization (country), the specific units, product lines, product ids, etc., wherein each invoice can include invoice date, invoice amount, invoice quantity, purchaser details, etc. In this example, the revenue of the site (i.e., the highest node in the hierarchy) can be associated with a time series data set while revenues of each of the units, categories, and products can be represented by a respective time series data sets. Thus, values of an attribute of an entity collected over time can be represented by the corresponding time series data set. The AI-based data processing system 100 enables analysis of the plurality of time series data sets 152 by DL models thereby improving the operation of computing equipment to generate accurate forecasts, what-if scenarios, etc. More particularly, the AI-based data processing system 100 is configured to transform the plurality of time series data sets 152 to generate a corresponding plurality of transformed time series data sets 154 which can be readily consumed by the DL models 182 to enable functionality as outlined herein.

The AI-based data processing system 100 includes an input receiver 102, a data transformer 104, a model trainer 108, a forecast generator 108, and an output provider 110. The input receiver 102 accesses the input data 150 including the plurality of time series data sets 152 and provides them to the data transformer 104 for transformation into the plurality of transformed time series data sets 154. The data transformer 104 includes a data flattening processor 142 and a data stacking processor 144. The data flattening processor 142 maintains the time series behavior while transforming the plurality of time series data sets 152 so that they may be analyzed by the DL models 182 of the forecast generator 108. More particularly, the data flattening processor 142 transforms the attributes or vectors in the plurality of time series data sets 152 into independent variables that help the DL models 182 learn trend behavior while taking care of the seasonal and cyclic dependencies. In an example, a single dependency in a time series data set is transformed into a multidimensional dependency by the data flattening processor 142.

The flattened data from the plurality of time series data sets 152 is further processed by the data stacking processor 144 in order to establish the hierarchical relationships between the plurality of time series data sets 152 based on the hierarchical relationships between the different entities. This is necessary as the plurality of time series data sets 152 are individual series with different behaviors and can only be modeled separately. Although the attribute values of the different entities are collected periodically, the volume of data generated is not adequate for training DL models used for forecasting. The data stacking processor 144 generates the plurality of transformed time series data sets 154 wherein hierarchical relationships have been established therebetween so that learning can be transferred from one series to another series.

The plurality of transformed time series data sets 154 are provided to the forecast generator 108 for generation of forecasts, enablement of what-if scenarios, etc. The forecast generator 108 includes one or more DL models 182 for generating the forecasts. In an example, the features can be extracted from the plurality of transformed time series data sets 154. In addition, third-party data accessed from external data sources can also be used for generating the forecasts 184. Referring back to the example of revenue forecasts associated with the different entities of an organization, the features extracted can include but are not limited to raw/derived features such as invoices, holiday lists, fiscal calendar, market share, macroeconomic data, etc. In an example, the DL models 182 can include sequential models wherein the output of a first DL model is provided to a second DL model for generating the forecasts and/or what-if scenarios. In an example, the forecasts can be generated on-demand when a user request is received or periodically at preset times .e.g., monthly, weekly or fortnightly, etc.

The output such as the forecasts 184 generated by the forecast generator 108, the what-if scenarios, etc., can be provided to the users by the output provider 110 via different modalities. In an example, the forecasts 184 can be periodically generated and supplied to users via emails, updates to specific user interfaces (UIs) or other notifications. In an example, the forecasts 184 can be generated on demand and displayed to the requesting user via a dashboard 112. The dashboard 112 can provide a user interface (UI) wherein a user can vary different input parameters via different UI elements such as text boxes, sliders, combo-boxes, etc., for the DL models 182 to study different what-if scenarios. Thus, the DL models 182 can receive the user input and almost instantaneously generate the forecasts and display such output on the dashboard 112. Thus, an improved UI is enabled via the data transformation implemented by the data transformer 104 which allows the processing of time series data by the DL models 182.

The model trainer 106 accesses training data 174 generated from historical data 172 to train the DL models 182. Again, the historical data 172 can include historical time series data sets pertaining to the different hierarchical entities. The historical time series data sets are also processed by the data transformer 104 to execute the data flattening and the data stacking processes to generate transformed historical time series data sets which form the training data 174. In an example, the training data 174 may also include the corresponding real-world values along with the transformed historical time series data sets (e.g., labeled training data) for supervised learning. In an example, the DL models 182 can be automatically updated each time new data is produced for one or more of the different entities. For example, if the DL models 182 are generating monthly forecasts for February and the actual numbers are released for January, then the actual numbers are automatically provided to update the DL models 182.

Figure 2:
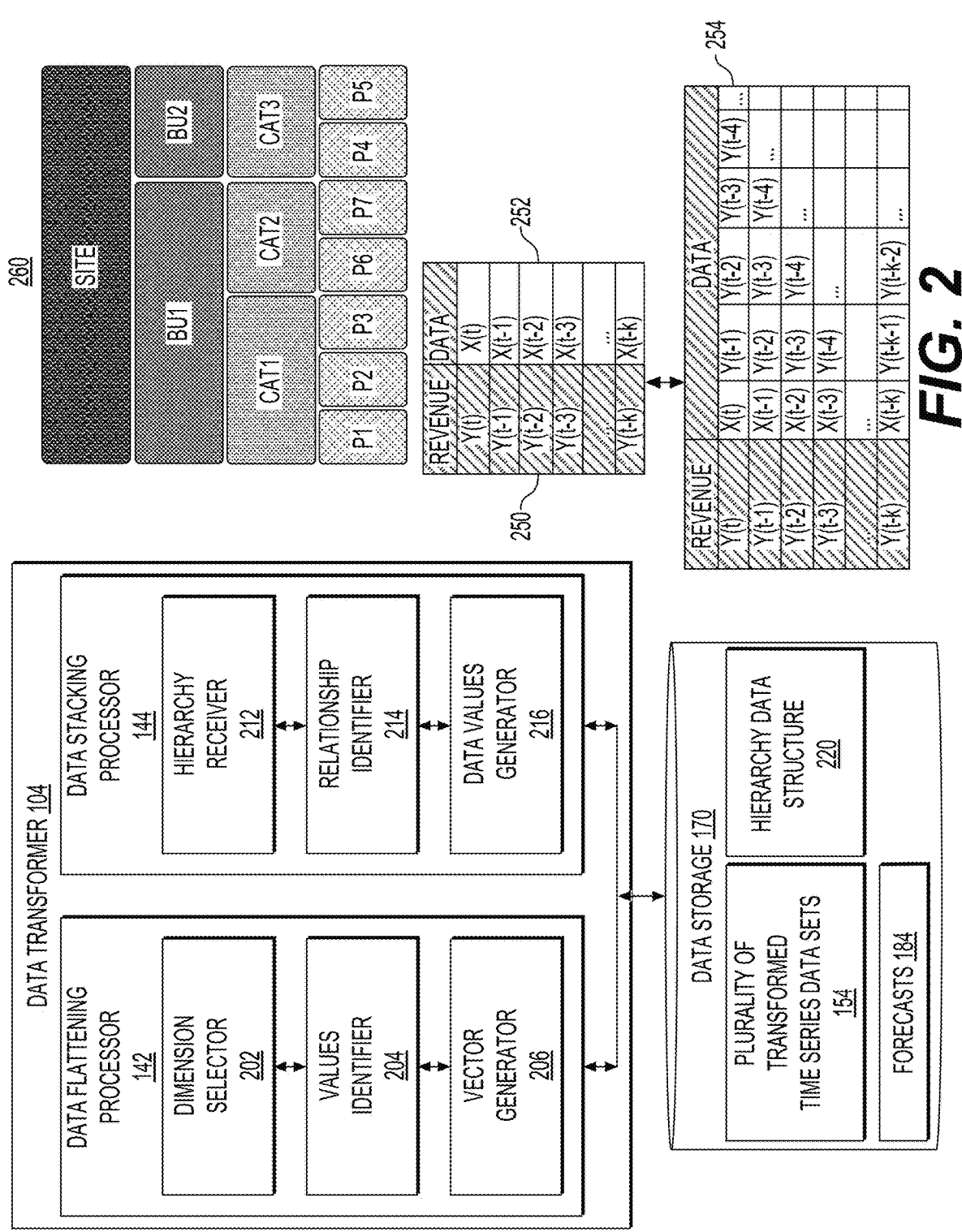
FIG. 2 shows a block diagram of a data transformer in accordance with the examples disclosed herein.

FIG. 2 shows a block diagram of the data transformer 104 in accordance with the examples disclosed herein. The data transformer 104 including the data flattening processor 142 and the data stacking processor 144 transforms the plurality of time series data sets 152 into the plurality of transformed time series data sets 154 that can be processed by the DL models 182 in the forecast generator 108. The data transformer 104 operates based on the hierarchy of entities. An example entity hierarchy 260 pertaining to a product hierarchy is shown which contains a mapping among all the various units, product lines, and specific products. In the entity hierarchy 260, a site is the highest entity or node which includes two business units BU1 and BU2. BU1 includes two categories Cat1, Cat2 while BU2 includes one category Cat3. Each of the categories has products associated therewith. For example, Cat1 is associated with products P1, P2, and P3 while Cat2 is associated with P6, P7, and Cat3 is associated with P4 and P5. In an example, the entities in the entity hierarchy 260 maintain top-down relationships while it can be assumed for calculations that entities in the same level are not interdependent so that the attributes of one entity are not affected by attributes of other entities at the same level of the entity hierarchy 260.

The data flattening processor 142 builds a vector for each time series data set of the plurality of time series data sets 152 based on the entity hierarchy 260. Accordingly, the data flattening processor 142 includes a dimension selector 202, a values identifier 204, and a vector generator 206. For example, two time series data sets 250 and 252 can be selected wherein the time series data set 250 represents that value of a variable Y(t) which is predicted based on prior values including Y(t–1), Y(t–2), ... Y(t–k) etc. Similarly, in the time series data set 252 X(t) is predicted based on prior values including X(t–1), X(t–2), etc. The dimension selector 202 selects X as a dimension to generate a vector for Y(t)

based on the entity hierarchy 260. The dimension selector 202 can thus select different dimensions for vector generation based on the dependencies identified from the entity hierarchy 260. The values identifier 204 identifies the value of 'k' which is the number of historical values of Y that are selected to build the vector Y(t). In an example, autoregression can be employed by the values identifier 204 to determine the value of 'k'. Upon determining the value of 'k', the vector generator 206, generates the vector for Y(t) using the corresponding X(t) value and 'k' historical values of Y as shown at 254. Similarly, vectors may be generated for each of the Y(t–1), Y(t–2), etc., historical values when initially training the DL models 182 with the historical data 172.

The data stacking processor 144 initially sets up the dependencies between the entities based on the entity hierarchy 260. The data stacking processor 144 can include a hierarchy receiver 212, a relationship identifier 214, and a data values generator 216. In an example, a hierarchy data structure 220 e.g., a knowledge graph encoding the dependencies of the entity hierarchy 260 can be accessed by the hierarchy receiver 212, and the dependencies can be identified by the relationship identifier 214 using the nodes and the edges of the hierarchy data structure 220. Based on the dependencies, the data values generator 216 can generate additional values encoding the dependencies and add them to the time series vectors to output the plurality of transformed time series data sets 154.

Figure 3:
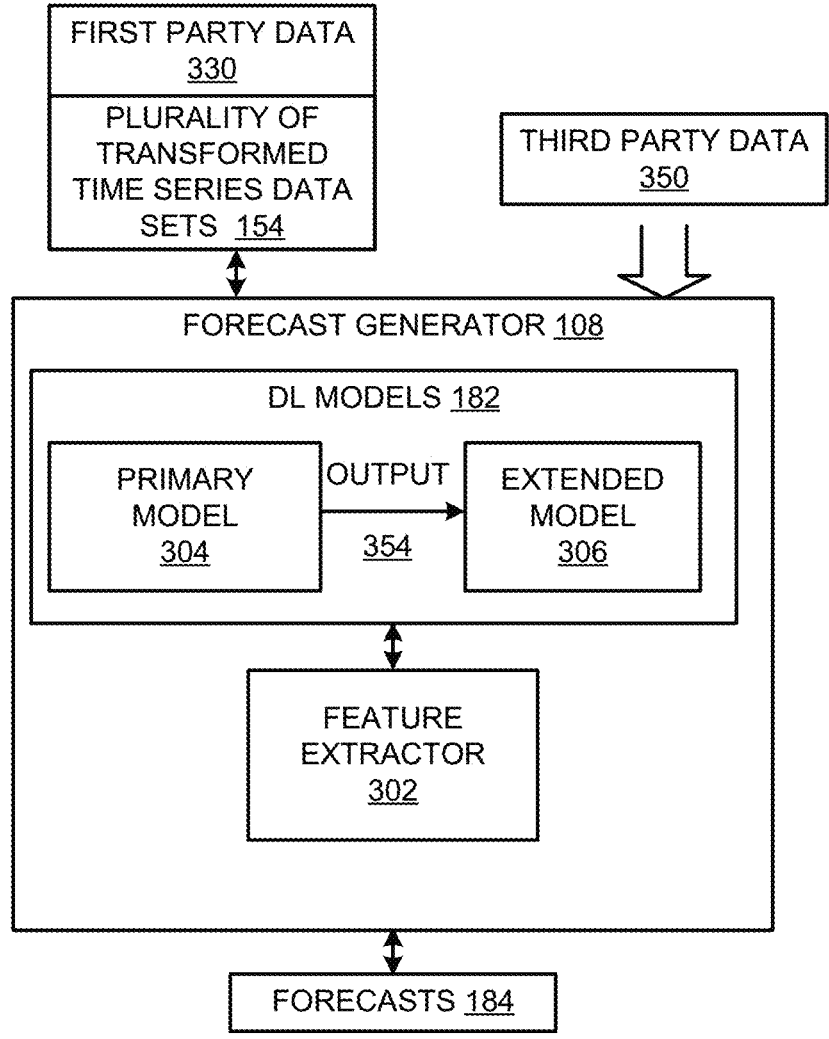
FIG. 3 shows a block diagram of a forecast generator in accordance with the examples disclosed herein.

FIG. 3 shows a block diagram of the forecast generator 108 in accordance with the examples disclosed herein. The forecast generator 108 uses the plurality of transformed time series data sets 154 in conjunction with external, third-party data 350 to generate the forecasts 184. The feature extractor 302 is configured to extract features from the plurality of transformed time series data sets 154 and the third-party data 350. The DL models 182 including a primary model 304 and an extended model 306 form a set of sequential models that are used to produce the forecasts 184. The primary model 304 is trained using first-party data and accordingly produces forecasts associated with attributes that can be produced using the first-party data. In an example, first-party data 330 can be accessed from local data sources of the AI-based data processing system 100 such as data accessed from local storage or internal proprietary data which can include one or more of the plurality of time series data sets 152, etc. Referring again to the example of revenue forecast generation, the plurality of time series data sets 152 can include invoices, balance sheets, or other internal documents or exclusive data that enable generating revenue forecasts.

In an example, the extended model 306 can also be a long short term memory (LSTM) model identical to the primary model 304 in terms of the model structure, the number of layers, the activation function used, etc. However, the extended model 306 is trained via supervised methods on third-party data 350 instead of the plurality of time series data sets 152 to produce corresponding outputs. The extended model 306 receives an output 354 of the primary model 304 in addition to third-party data for training and to generate other forecasts or even what-if scenarios. Third-party data can include data from external sources that is available publicly or for purchase, such as but not limited to, holiday list and fiscal calendar, gross domestic product (GDP) numbers, market share information, and other macroeconomic data. The third-party data 350 can be processed by the data transformer 104 if necessary, e.g., when the third-party data 350 includes time series data sets before being provided to the extended model 306. Furthermore, the DL models 182 are configured for automatic updates so that each time one of the plurality of time series data sets 152 or another first-party data 330 is updated the primary model 304 is automatically updated. In an example, the new data can include the actual values obtained on the occurrence of the predetermined future time steps for the one or more corresponding variables for which forecasts were generated by the primary model 304. Similarly, if any portion of the third-party data 350 is updated, the extended model 306 is also automatically updated by the model trainer 106.

In an example, the process of automatic DL model updates may begin even as new data is received. The DL models are designed or configured so that the parameters and the hyperparameters are automatically updated. An ACF test is initially conducted to identify the historical dependency within a given time series data. For example, the ACF test enables determining the number of prior time series values to be selected. The DL models are trained to execute grid search and pick the number of time series values based on the output of the ACF test. Thus, automatic model updates for the DL models may involve updating parameters like historic dependency, learning rate, etc. Other model-specific parameters such as number of neurons, number of layers, etc., may also be automatically updated. Such automatic updates improve the efficiency of the AI-based data processing system 100 as similar manual updates may take days or even weeks for completion depending on the complexity.

Figure 4:
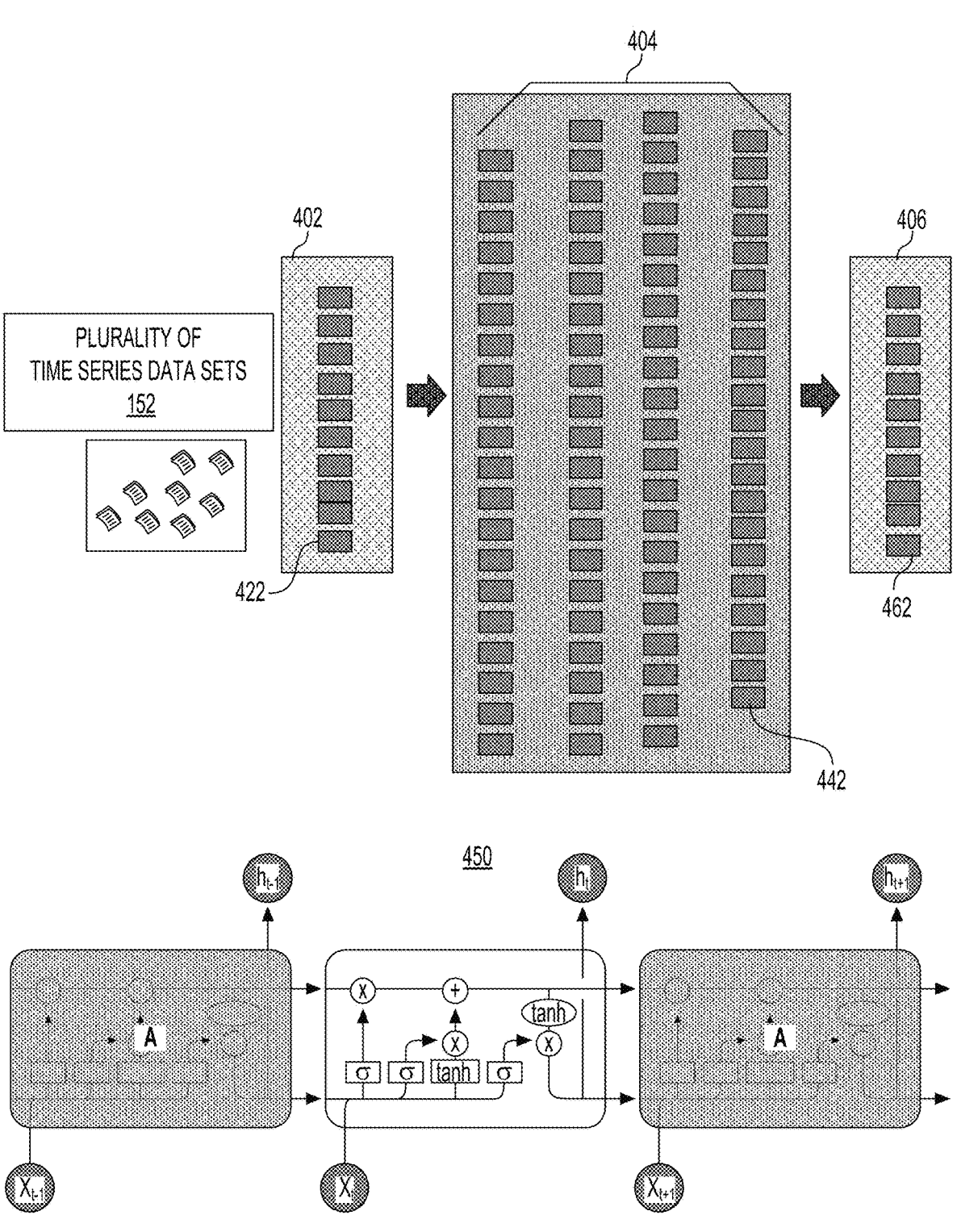
FIG. 4 shows representations of deep learning (DL) models in accordance with the examples disclosed herein.

FIG. 4 shows representations of DL models in accordance with the examples disclosed herein. An artificial neural network e.g., one of the deep learning models 182, takes some input data, transforms this input data by calculating a weighted sum over the inputs, and applies a non-linear function to this transformation to calculate an intermediate state. These three steps constitute what is known as a layer, and the transformative function is often referred to as a unit. The intermediate states—often termed features—are used as the input into another layer. Through repetition of these steps, the artificial neural network learns multiple layers of non-linear features, which it then combines in a final layer to create a prediction. A DL model representation 400 has an input layer 402, multiple intermediate layers 404 that transform a received input, and an output layer 406 that provides the forecasts 184.

Each of the layers 402, 404, and 406 can constitute one or more units e.g., 422, 442, and 462 by which the inputs are transformed via a non-linear activation function. A unit has several incoming connections and several outgoing connections. In an example, the units of the DL models can include long short-term memory (LSTM) units which can have multiple activation functions and which compute the final output over an array of non-linear transformed input values. An activation function takes in weighted data (matrix multiplication between input data and weights) and outputs a non-linear transformation of data. In an example, the activation function used in the DL models 182 is the rectified linear activation function (ReLU).

The data flattening processor 142 combines data to train the DL models 182 that can learn all the dependencies among the series with other data such as intra-series dependency, seasonal interactions, dependency on fiscal/holiday calendar, inter-series dependency using product hierarchy, etc. The complex relations among the components are learned using hidden layers e.g., the intermediate layers 404 that enable the solution to explore complex patterns and learn them. The output layer 406 has the output that the DL model has to learn during training. During the generation of the forecasts, the user inputs are resolved into a single framework e.g., one of the plurality of transformed time series data sets 154, including the relevant holiday and fiscal calendar related features, which is passed into one of the DL models 182 such as extended model 306 wherein the particular neurons are selected for generating the forecasts 184.

LSTM units such as the LSTM unit 450 are included in each of the DL models 182 for learning and preserving the sequential nature of the data which strengthens the learning on this type of data. The LSTM units learn the sequential patterns in the data and can preserve long-term and short-term trends. Activation functions are one of the important variables in the LSTM DL models that learn the data and pass the information to subsequent layers in the model. As the long-term dependencies in the plurality of time series data sets 152 need to be learned in order to generate forecasts or the what-if scenarios, the ReLU activation function which mitigates the problem of exploding and vanishing gradients is selected.

3. Flowcharts

FIG. 5 shows a flowchart 500 that details a method of processing time series data using DL models in accordance with the examples disclosed herein. The method begins at 502 wherein plurality of time series data set 152 are accessed. In addition, external data from third-party data sources can also be accessed. At 504, the plurality of time series data sets 152 are converted or transformed into the plurality of transformed time series data sets 154 via data flattening and data stacking. At 506, the plurality of transformed time series data sets 154 are provided for processing to the primary model 304. At 508, it is determined if further processing by the extended model 306 is necessary. If no processing is required by the extended model 306, the method proceeds to 514 to output the result of the primary model 304. In an example, the output of the primary model 304 can include one or more of the forecasts 184 that can be generated from the plurality of time series data sets 152 without using the third-party data 350. For example, some revenue forecasts can be generated from internal invoices without accessing the third-party data 350. Such output can be accessed at step 508.

However, using third-party data 350 can increase the accuracy of forecasts and further enables users to create what-if scenarios which enhance the utility of the plurality of time series data sets 152 and improves the dashboard 112 mechanism by enabling visualization of what-if scenarios via one or more of textual, graphical or image modalities. If it is determined at 508 that the third-party data 350 needs to be accessed, then the third-party data 350 is accessed at 510. As mentioned above, the third-party data 350 can include data regarding holidays and fiscal calendars, market share data, global GDP data, etc. At 512, the output from the primary model 304 and the third-party data 350 is provided to the extended model 306 and the output obtained from the extended model 306 can be provided to users via the dashboard 112 at 514.

Figure 6:
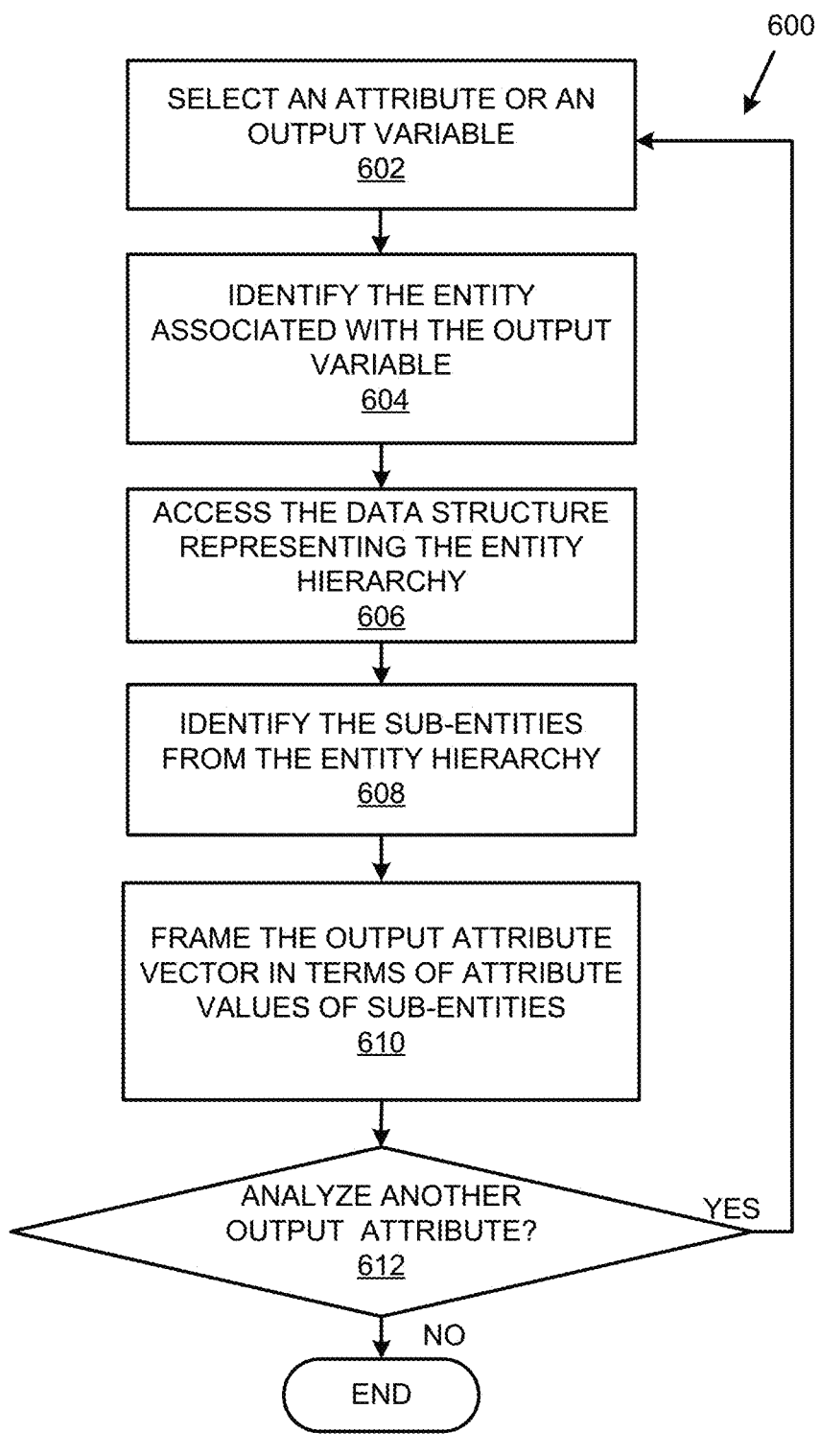
FIG. 6 shows a flowchart that details a method of data flattening in accordance with the examples disclosed herein.

FIG. 6 shows a flowchart 600 that details a method of data flattening in accordance with the examples disclosed herein. The below describes the data flattening procedure as occurring serially. However, it may be appreciated that this description is only for illustration purposes and that the data flattening may also occur in parallel wherein multiple outputs can be analyzed simultaneously. In an example, the data flattening procedure outlined in the flowchart 600 may be executed by the data flattening processor 142. The method begins at 602 wherein an attribute/output variable is selected. At 604, the entity associated with the output variable is identified. For example, if the output variable is product revenue, then the specific product associated with the revenue is identified. At 606, a data structure representing the entity hierarchy 260 is accessed. In an example, the data structure can include a hierarchical knowledge graph wherein the nodes represent entities and the edges represent the relationships between the entities. At 608, the entity hierarchy 260 is analyzed to identify the sub-entities contained therein. For example, if the entity hierarchy 260 is represented in a flat file/database with specific entries representing hierarchical relations, then the specific columns/ data entities are analyzed for the identification of the sub-entities. Alternately, if the entity hierarchy 260 is represented as a knowledge graph, traversing the knowledge graph can provide information regarding the parent nodes which are nodes higher up in the hierarchy and leaf nodes which are sub-entities or entities lower down in the hierarchy. In the current context, the sub-entities or entities lower down in the hierarchy are contained in the entities higher up in the hierarchy. Therefore, any output/attribute associated with the higher entities can depend on the attributes of the lower entities contained therein. As a result, if the output is expressed as a vector, then the dimensions of the vector include the attributes of the lower entities that affect the output of the higher entity. Accordingly, the output attribute vector at a specific time step is framed at 610 to include as dimensions, the attribute values of the sub-entities at the previous time steps. The weights to be associated with the sub-entity attributes are learned via supervised training. At 612, it is determined if another output attribute remains to be analyzed. If yes, the method returns to 602 to select the attribute. If no attribute remains for analysis, the method terminates on the end block. Hence, the plurality of time series data sets 152 are flattened by establishing relationships between the different variables based on the entity hierarchy.

Figure 7:
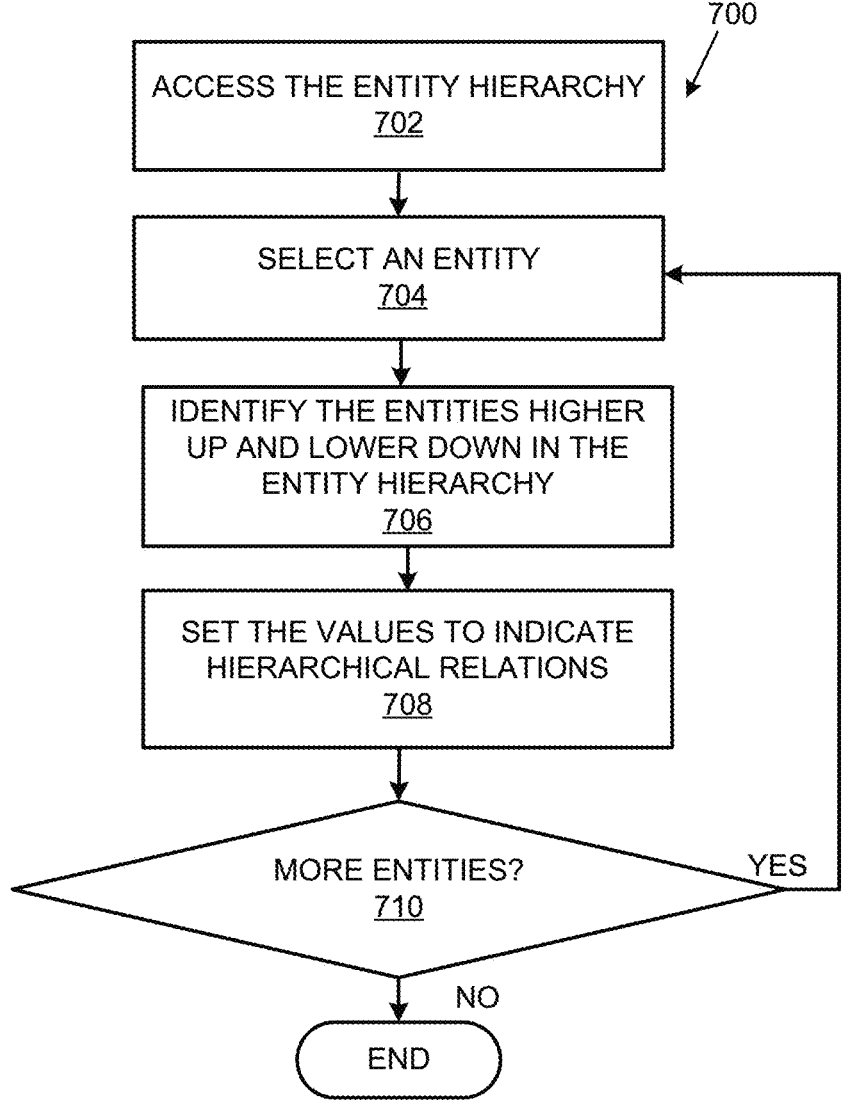
FIG. 7 shows a flowchart that details a method of data stacking in accordance with the examples disclosed herein.

FIG. 7 shows a flowchart 700 that details a method of data stacking in accordance with the examples disclosed herein. In an example, the data flattening procedure outlined in flowchart 700 may be executed by the data stacking processor 144. The method begins at 702 wherein the entity hierarchy 260 is accessed. At 704, an entity is selected. At 706, the entities higher up in the hierarchy and the entities lower down in the hierarchy are identified for the selected entity. In an example, the information regarding the hierarchical entity relations may be manually entered. In an example, the information regarding the hierarchical entity relations can be automatically obtained via documents with the appropriate markup or data structures such as knowledge graphs. At 708, the values indicating the relations between the selected entity and the other entities are set in a flat-file/database. At 710, it is determined if more entities remain for processing. If more entities remain to be processed, the method returns to 702, else the method terminates on the end block. Again, it may be appreciated that this description of the data stacking procedure is only for illustration purposes and that the data stacking may also occur in parallel wherein multiple outputs can be analyzed simultaneously.

Figure 8:
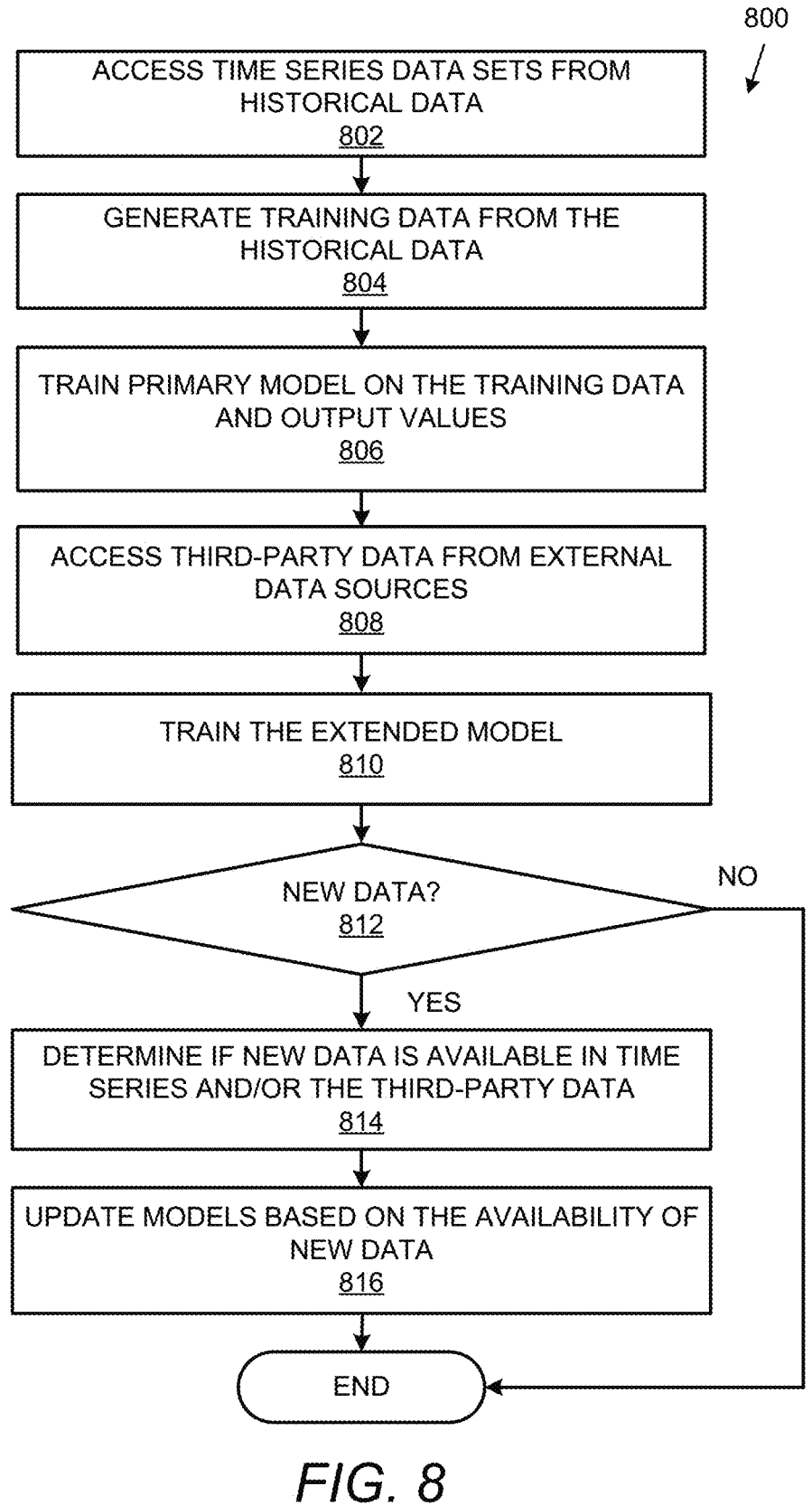
FIG. 8 shows a flowchart for training the DL models in accordance with the examples disclosed herein.

FIG. 8 shows a flowchart 800 for training the DL models 182 in accordance with the examples disclosed herein. At 802, the time series data sets in the historical data 172 i.e., historical time series data sets are accessed. At 804, the time series data sets from the historical data 172 are transformed by the data transformer 104 to generate transformed time series data sets via data flattening and data stacking procedures as described herein. The transformed time series data sets generated from the historical data 172 form the training data for the DL models 182. This addresses the problem of sparse availability of time series data to train the DL models 182. With the increase in the training data volume, the primary model 304 is trained on the transformed time series data sets with the corresponding output values at 806. In an example, the number of transformed time series data sets generated at 804 At 808, third-party data from external data sources used to train the extended model 306 is accessed. The extended model 306 is trained on the third-party data and the outputs of the primary model 304. Furthermore, the AI-based data processing system 100 is configured to automatically update the DL models 182 when there is new data, either in the time series data sets or the third-party data. Accordingly, it is determined at 812, if there is new data. If there is no new data, the process terminates on the end block. However, if it is determined at 812 that there is new data, it is further determined at 814 if there is new data in the time series data sets originating for one of the entities in the entity hierarchy 260 or from one of the external data sources providing the third-party data. At 816, one or more of the primary model 304 or the extended model 306 is updated depending on the particular data that is updated.

Figure 9A:
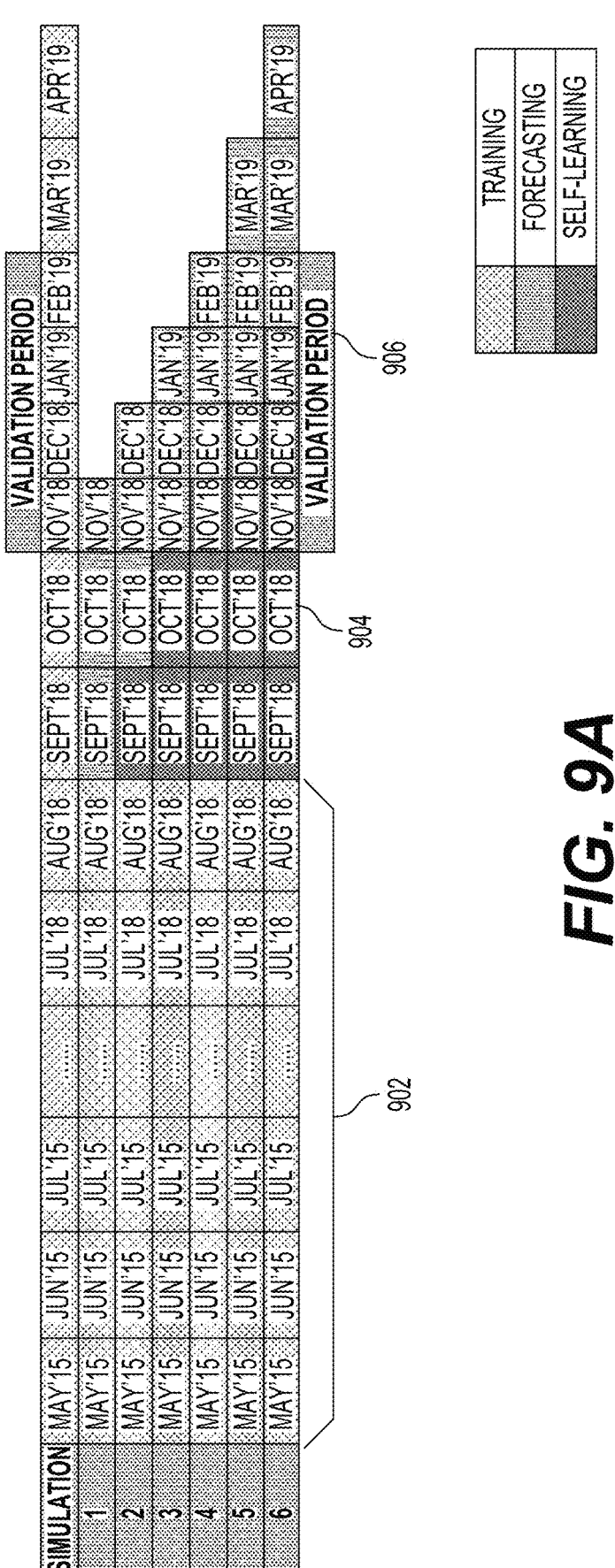
FIGS. 9A and 9B show examples of simulation and validation strategies and the self-learning framework used for automatic model updates in accordance with the examples disclosed herein.
Figure 9B:
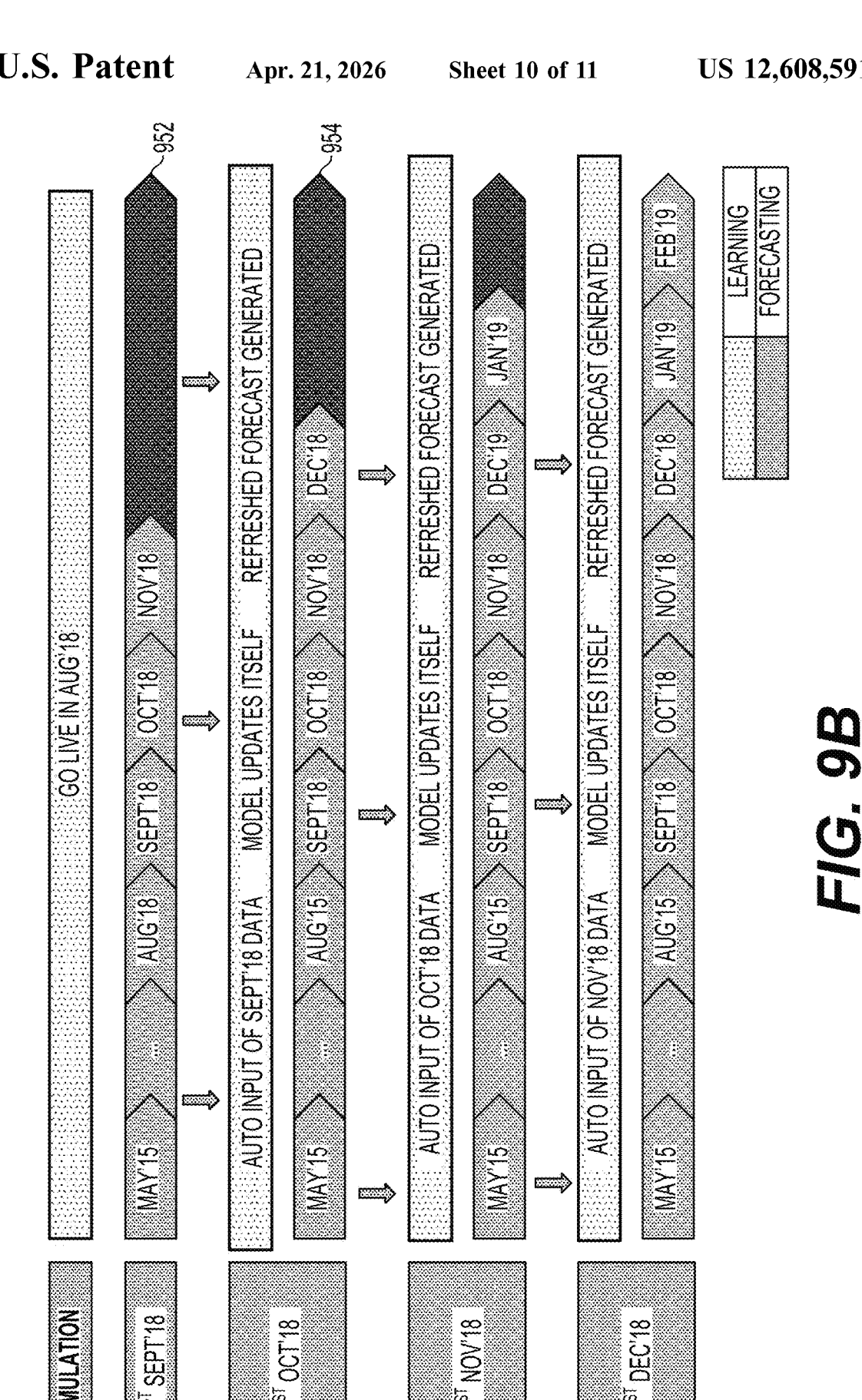

FIGS. 9A and 9B show examples of simulation and validation strategies and the self-learning framework used for automatic model updates in accordance with the examples disclosed herein. FIG. 9A shows the periods wherein the historical data is available 902, the periods for which the DL models 182 produce the forecasts 184 and the self-learning periods 186. The historical data available for training includes data from May '15-April '19 and the DL models 182 are trained using the data from May '15-August '18 while forecasts were generated using the trained DL models from September '18-April '19. The simulations were carried out using rolling window method by increasing the training period by a month and forecasting for the next 3 months as shown at 904. As new data for a given month becomes available, the DL models 182 can be automatically updated. For example, forecasts are produced for the month of September '18 but as the data becomes available for September '18, the DL models 182 may be automatically updated. The performance of the DL models 182 can be measured in mean absolute percentage error (MAPE) wherein $$MAPE = absolute((Forecasted\ value - Actual\ value)/Actual\ value)*100$$

Thus, a predetermined future time period or predetermined future time steps can include the month out=$\{1, 2, 3\}$ i.e., how far the forecast is from the training period. The validation period 906 shown in FIG. 9A is November '18-February '19 since for these four months, the forecast for all the three month out values are available.

FIG. 9B depicts the self-learning mode of the DL models 182 every month. This learning framework is an automated setup where the DL models 182 keep learning from the latest data. For example, the DL models 182 may generate forecasts for September '18-November '18 at 952. But as September '18 data becomes available at 954, the DL models 182 automatically learn from the newly available data. For example, the invoices for the previous month e.g., September '18 are automatically fed to the DL models 182 in October '18. Hence, it is not necessary to manually tune or train the DL models 182. Accordingly, refreshed forecasts are generated by the DL models 182. For example, predictions for November '18 will be generated at three points in time using the recent data available including:

On 1$^{st}$ September '18, using the DL models 182 updated with data learned till August '18,

On 1<sup>st</sup> October '18 using the DL models 182 updated with data learned till September '18, and On 1<sup>st</sup> November '18 using the DL models 182 updated with data till October '18.

As a result, the forecasts generated by the DL models 182 for October '18 at 952 may be different from the forecasts generated at 954 upon updates.

Figure 10:
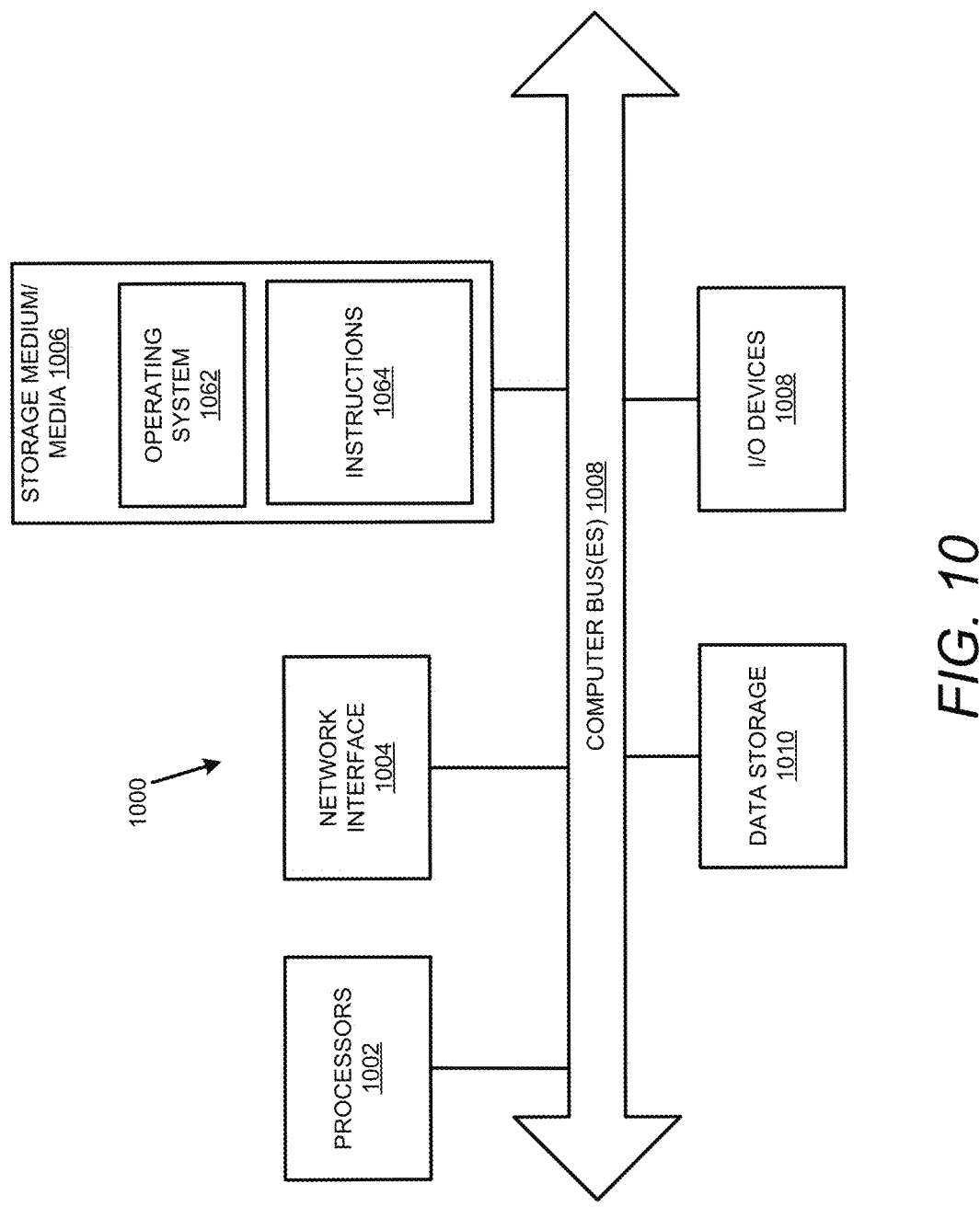
FIG. 10 illustrates a computer system that may be used to implement the AI-based data processing system in accordance with the examples disclosed herein.

FIG. 10 illustrates a computer system 1000 that may be used to implement the AI-based data processing system 100 in accordance with the examples disclosed herein. More particularly, computing machines such as desktops, laptops, smartphones, tablets, and wearables which may be used to generate or access the data from the AI-based data processing system 100 may have the structure of the computer system 1000. The computer system 1000 may include additional components not shown and that some of the process components described may be removed and/or modified. In another example, a computer system 1000 can sit on external-cloud platforms such as Amazon Web Services, AZURE® cloud or internal corporate cloud computing clusters, or organizational computing resources, etc.

The computer system 1000 includes processor(s) 1002, such as a central processing unit, ASIC or another type of processing circuit, input/output devices 1008, such as a display, mouse keyboard, etc., a network interface 1004, such as a Local Area Network (LAN), a wireless 802.11x LAN, a 3G, 4G or 10G mobile WAN or a WiMax WAN, and a processor-readable medium 1006. Each of these components may be operatively coupled to a bus 1008. The processor-readable or computer-readable medium 1006 may be any suitable medium that participates in providing instructions to the processor(s) 1002 for execution. For example, the processor-readable medium 1006 may be a non-transitory or non-volatile medium, such as a magnetic disk or solid-state non-volatile memory, or a volatile medium such as RAM. The instructions or modules stored on the processor-readable medium 1006 may include machine-readable instructions 1064 executed by the processor(s) 1002 that cause the processor(s) 1002 to perform the methods and functions of the AI-based data processing system 100.

The AI-based data processing system 100 may be implemented as software or machine-readable instructions stored on a non-transitory processor-readable medium and executed by one or more processors 1002. For example, the processor-readable medium 1006 may store an operating system 1062, such as MAC OS, MS WINDOWS, UNIX, or LINUX, and code 1014 for the AI-based data processing system 100. The operating system 1062 may be multi-user, multiprocessing, multitasking, multithreading, real-time, and the like. For example, during runtime, the operating system 1010 is running and the code for the AI-based data processing system 100 is executed by the processor(s) 1002.

The computer system 1000 may include a data storage 1010, which may include non-volatile data storage. The data storage 1010 stores any data used by the AI-based data reconciliation system. The data storage 1010 may be used as the data storage 170 to store the plurality of time series data sets 152, the plurality of transformed time series data sets 154, the forecasts 184, and other data elements which are generated and/or used during the operation of the AI-based data processing system 100.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based data processing system, comprising:

at least one processor;

a non-transitory processor-readable medium storing machine-readable instructions that cause the processor to:

receive input data including a plurality of time series data sets generated for different entities at a given time step, wherein each of the plurality of time series data sets is associated with a corresponding variable and the different entities maintain a hierarchical relationship encoded in an entity hierarchy;

generate a plurality of transformed time series data sets for each of the plurality of time series data sets, wherein the corresponding variable associated with each of the plurality of time series data sets is expressed in one of the plurality of transformed time series data set as a vector with dimensions including other corresponding variables associated with other time series data sets of the plurality of time series data sets;

provide the plurality of transformed time series data sets to deep learning (DL) models including a primary model and an extended model forming a set of sequential models that provide forecasts for values for one or more of the corresponding variables at predetermined future time steps, wherein the primary model is trained using first-party data from local data sources that include the plurality of time series data sets, and the primary model provides an output using the plurality of transformed time series data sets, and wherein the extended model is a long short term memory (LSTM) model which is trained via supervised methods on third-party data that is different than the plurality of time series data sets, and the extended model receives the output of the primary model in addition to the third-party data for training and to generate the forecasts;

obtain the forecasts for values for the one or more of the corresponding variables at the predetermined future time steps;

output the forecasts for values for the one or more of the corresponding variables via a graphical user interface (GUI); and automatically update the DL models on new data associated with the one or more of the corresponding variables, wherein the DL models are configured for automatic updates based on each time one of the plurality of time series data sets or the first-party data is updated for the primary model, and wherein the DL models are configured for automatic updates based on any portion of the third-party data is updated for the extended model, wherein the machine-readable instructions further cause the processor to:
- determine whether processing by the extended model is necessary;
- in response to a determination that processing by the extended model is not necessary, output the output of the primary model via the GUI without accessing the third-party data, wherein the forecasts are generated based the plurality of transformed time series data sets; and
- in response to a determination that processing by the extended model is necessary, access the third-party data and provide the output from the primary model along with the third-party data to the extended model to generate the forecasts, wherein the forecasts enable visualization of what-if scenarios via the GUI in one or more of textual, graphical, or image modalities.

2. The AI-based data processing system of claim 1, wherein at least one entity of the different entities includes one or more of the different entities as sub-entities.

3. The AI-based data processing system of claim 2, wherein to generate the plurality of transformed time series data sets, the processor is to:
- combine the plurality of time series data sets via data flattening.

4. The AI-based data processing system of claim 3, wherein to combine the plurality of time series data sets via data flattening, the processor is to:
- identify an entity of the different entities wherein the corresponding variable is an attribute of the entity;
- identify one or more sub-entities of the entity from the entity hierarchy; and
- frame the vector for the corresponding variable, wherein the other corresponding variables forming the dimensions of the vector are attributes of the one or more sub-entities.

5. The AI-based data processing system of claim 3, wherein to generate the plurality of transformed time series data sets, the processor is to:
- further combine the plurality of time series data sets via data stacking.

6. The AI-based data processing system of claim 5, wherein to further combine the plurality of time series data sets via data stacking, the processor is to:
- identify an entity from the entity hierarchy wherein the corresponding variable is an attribute of the entity;
- determine, from the different entities, other entities that are higher up or lower down the entity in the entity hierarchy; and
- set values in a corresponding transformed time series data set of the plurality of transformed time series data sets, wherein the values indicate hierarchical relations between the entity and the other entities.

7. The AI-based data processing system of claim 1, wherein the LSTM model preserves long and short term trends in the plurality of time series data sets.

8. The AI-based data processing system of claim 7, wherein an activation function of the LSTM model is Rectified Linear Unit (ReLU) function.

9. The AI-based data processing system of claim 1, wherein to automatically update the DL models, the processor is to:
- receive as the new data, actual values of the one or more of the corresponding variables on occurrence of the predetermined future time steps.

10. The AI-based data processing system of claim 1, wherein the processor is to further:
- access historical data including historical time series data sets;
- generate training data by transforming the historical time series data sets into transformed historical time series data sets; and
- train the DL models on the training data.

11. The AI-based data processing system of claim 1, wherein to automatically update the DL models, the processor is to:
- train the DL models on actual values of the corresponding variables collected on an occurrence of the predetermined future time steps.

12. The AI-based data processing system of claim 1, wherein the input data includes invoice data pertaining to the different entities and the forecasts are related to revenue forecasts.

13. The AI-based data processing system of claim 1, wherein to generate the plurality of transformed time series data sets, the processor is to:
- select, via a dimension selector, the dimensions for the vector representing the corresponding variable based on dependencies identified from the entity hierarchy;
- determine, via a values identifier, a number of historical values of the corresponding variable using autoregression; and
- generate, via a vector generator, the vector for the corresponding variable using the selected dimensions and the determined number of historical values.

14. The AI-based data processing system of claim 1, wherein to generate the plurality of transformed time series data sets, the processor is to:
- access, via a hierarchy receiver, a hierarchy data structure encoding dependencies of the entity hierarchy;
- identify, via a relationship identifier, the hierarchical relationship between the different entities using nodes and edges of the hierarchy data structure; and
- generate, via a data values generator, additional values encoding the hierarchical relationship and add the additional values to the vector to output the plurality of transformed time series data sets.

15. A method of Artificial Intelligence (AI) data processing, comprising:
- accessing historical data including a plurality of time series data sets collected at different time steps for different entities of an entity hierarchy, wherein each of the plurality of time series data sets is associated with a corresponding variable;
- generating a plurality of transformed time series data sets for each of the plurality of time series data sets,
  - wherein the corresponding variable is associated with a time series data set of the plurality of time series data sets can be expressed in the transformed time series data set in terms of other corresponding variables associated with other time series data sets of the plurality of time series data sets;
- training deep learning (DL) models including a primary model and an extended model forming a set of sequential models to generate forecasts for the corresponding variables,
  - wherein the primary model is trained using first-party data from local data sources that include the plurality of time series data sets, and the primary model provides an output using the plurality of transformed time series data sets, and wherein the extended model is a long short term memory (LSTM) model which is trained via supervised methods on third-party data that is different than the plurality of time series data sets, and the extended model receives the output of the primary model in addition to the third-party data for training and to generate the forecasts;

receiving a user request for the forecasts for the corresponding variables, wherein the user request refers to one or more of the different entities, and one or more predetermined future time steps;

providing values related to the one or more different entities and the one or more predetermined future time steps from the user request to the DL models;

outputting the forecasts for the corresponding variables for the predetermined future time steps via a graphical user interface (GUI) based on the user request; and automatically updating the DL models on new data associated with one or more of the corresponding variables, wherein the DL models are configured for automatic updates based on each time one of the plurality of time series data sets or the first-party data is updated for the primary model, and wherein the DL models are configured for automatic updates based on any portion of the third-party data is updated for the extended model, wherein the method further comprising:

determine whether processing by the extended model is necessary;

in response to a determination that processing by the extended model is not necessary, output the output of the primary model via the GUI without accessing the third-party data, wherein the forecasts are generated based the plurality of transformed time series data sets; and in response to a determination that processing by the extended model is necessary, access the third-party data and provide the output from the primary model along with the third-party data to the extended model to generate the forecasts, wherein the forecasts enable visualization of what-if scenarios via the GUI in one or more of textual, graphical, or image modalities.

16. The method of claim 15, wherein the historical data includes the first-party data accessed from the local data sources and the third-party data accessed from external data sources.

17. A non-transitory processor-readable storage medium comprising machine-readable instructions that cause a processor to:

access historical data including a plurality of time series data sets generated at different time steps for different entities of an entity hierarchy, wherein each of the plurality of time series data sets is associated with a corresponding variable;

generate a plurality of transformed time series data sets for each of the plurality of time series data sets, wherein the corresponding variable associated with one time series data set of the plurality of time series data sets can be expressed in the transformed time series data set in terms of other corresponding variables associated with other time series data sets of the plurality of time series data sets;

train deep learning (DL) models including a primary model and an extended model forming a set of sequential models to generate forecasts for the corresponding variables, wherein the primary model is trained using first-party data from local data sources that include the plurality of time series data sets, and the primary model provides an output using the plurality of transformed time series data sets, and wherein the extended model is a long short term memory (LSTM) model which is trained via supervised methods on third-party data that is different than the plurality of time series data sets, and the extended model receives the output of the primary model in addition to the third-party data for training and to generate the forecasts;

receive a user request for the forecasts for the corresponding variables, wherein the user request refers to one or more of the different entities, and a predetermined future time period including one or more predetermined future time steps;

provide values related to the one or more different entities and the one or more future time steps from the user request to the DL models;

output the forecasts for the corresponding variables for the predetermined future time steps via a graphical user interface (GUI) based on the user request; and automatically update the DL models on new data associated with one or more of the corresponding variables, wherein the DL models are configured for automatic updates based on each time one of the plurality of time series data sets or the first-party data is updated for the primary model, and wherein the DL models are configured for automatic updates based on any portion of the third-party data is updated for the extended model, wherein the machine-readable instructions further cause the processor to:

determine whether processing by the extended model is necessary;

in response to a determination that processing by the extended model is not necessary, output the output of the primary model via the GUI without accessing the third-party data, wherein the forecasts are generated based the plurality of transformed time series data sets; and in response to a determination that processing by the extended model is necessary, access the third-party data and provide the output from the primary model along with the third-party data to the extended model to generate the forecasts, wherein the forecasts enable visualization of what-if scenarios via the GUI in one or more of textual, graphical, or image modalities.

18. The non-transitory processor-readable storage medium of claim 17, wherein to output the forecasts further causing the processor to:

provide the values from the user request to the primary model of the DL models wherein the primary model is trained on the first-party data from the local data sources to generate the forecasts.

19. The non-transitory processor-readable storage medium of claim 18, wherein to output the forecasts further causing the processor to:

provide the values from the user requests to the extended model of the DL models, wherein the extended model is trained on the third-party data from external data sources to generate the forecasts, wherein the forecasts include what-if scenarios.

\* \* \* \* \*